Dec. 27, 1955  R. NEUSCHOTZ  2,728,370
SPLINED INSERT NUT WITH EXTERNALLY THREADED LOCKING COLLAR
Filed Dec. 10, 1951
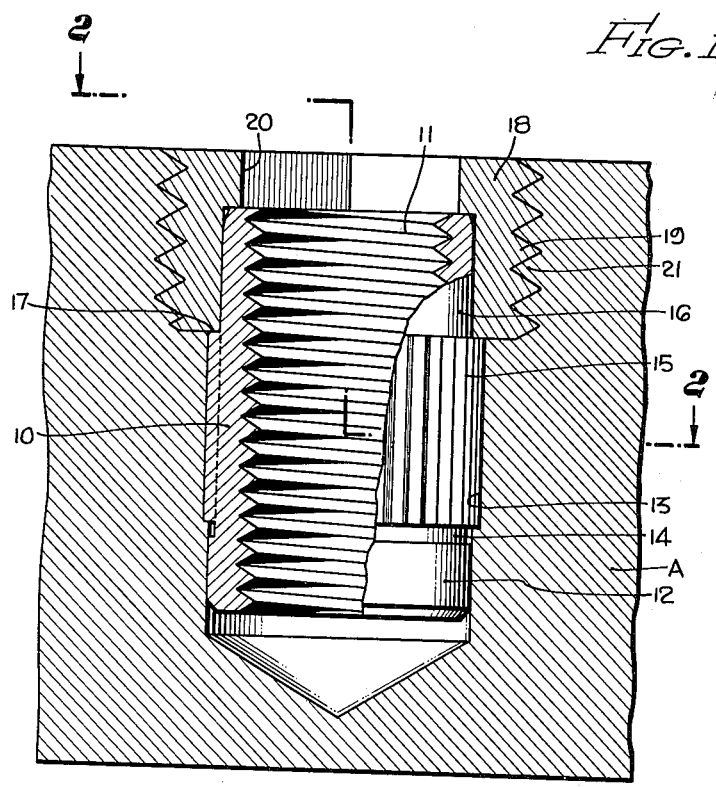
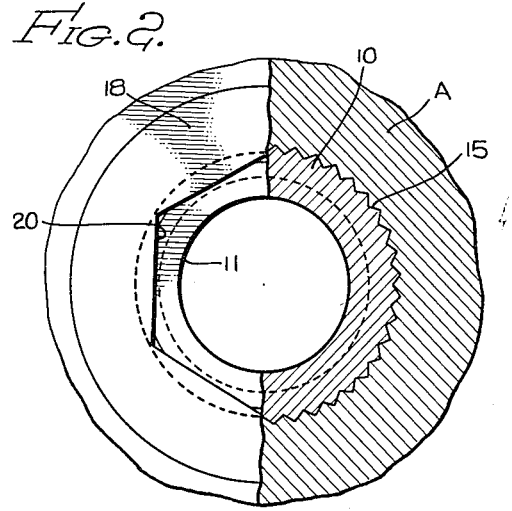
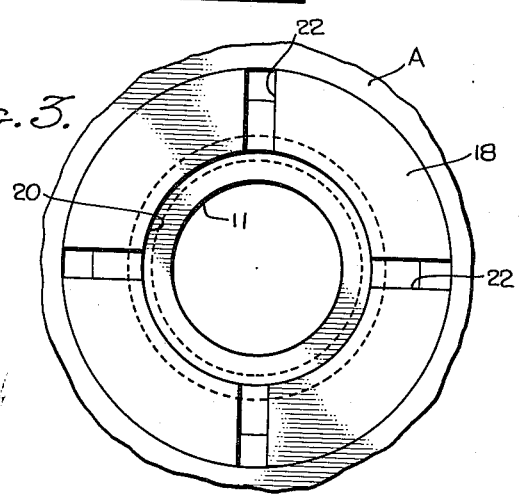
ROBERT NEUSCHOTZ,
INVENTOR.
BY
Hazard & Miller
ATTORNEYS

United States Patent Office 2,728,370
Patented Dec. 27, 1955

2,728,370

SPLINED INSERT NUT WITH EXTERNALLY THREADED LOCKING COLLAR

Robert Neuschotz, Los Angeles, Calif.

Application December 10, 1951, Serial No. 260,892

7 Claims. (Cl. 151—41.73)

This invention relates to improvements in insert nuts.

An object of the invention is to provide an insert nut that may be inserted into a drilled and tapped hole in an object to form an embedded nut into which a bolt, stud, or the equivalent may be screwed. The nut may also be used as a replacement nut for nuts that have been cast into objects but which have been removed therefrom due to injury such as to the threads thereof.

In nuts of the character herein described relatively thin tubular members have been employed which are internally threaded. Various means have been devised for anchoring the tubular members in material in which they are installed. If a bolt or stud is partially screwed into the tubular member and is subjected to severe longitudinal stresses the thread roots of the internal threads frequently weakened the walls of the tubular member to such an extent that the tubular member will part. In other instances, the threads on the bolt or stud bearing against the internal threads on the tubular member tend to expand the walls of the tubular member to such an extent that the tubular member may split.

An object of the invention is to provide an improved insert nut of this character consisting of an internally threaded tubular member and an externally threaded collar that is telescoped thereon, the collar being utilized not only to anchor the tubular member against pull-out but also to confine or enclose the outer end of the tubular member so that it cannot be split by a partially screwed in bolt or stud.

Another object of the invention is to provide an insert nut having the above-mentioned characteristics wherein a simple and advantageous means is employed by which the collar may be tightened in position.

Another object of the invention is to provide an insert nut having the above mentioned characteristics wherein the body of the nut is equipped with a pilot above which there is an annular groove designed to receive cuttings as the knurled portion thereof is forced into the hole.

With the foregoing and other objects in view, which will be made manifest in the following detailed description and specifically pointed out in the appended claims, reference is had to the accompanying drawing for an illustrative embodiment of the invention, wherein:

Figure 1 is a partial view in vertical section through an article in which the improved insert nut has been installed;

Fig. 2 is a view taken substantially upon the line 2—2 upon Fig. 1 in the direction indicated; and Fig. 3 is a top plan view illustrating an alternative form of construction.

Referring to the accompanying drawings wherein similar reference characters designate similar parts throughout, the improved nut consists of a tubular member 10 internally threaded from end to end with threads 11 adapted to receive a bolt, stud or the like. On the exterior of the tubular member adjacent the bottom thereof there is a pilot 12 or a substantially cylindrical portion extending a short distance up the exterior of the body 10 designed to rather closely fit the hole 13 in which the nut is to be installed in the article A. Immediately above this pilot there is an annular groove 14 and above the groove 14 the body is knurled or vertically serrated, as indicated at 15. The serrations 15 extend a substantial distance along the length of the exterior of the body and the diameter across the crests of the serrations is slightly greater than the diameter of the pilot 12. Above the serrations the exterior of the nut is smoothly formed preferably in the form of a cylinder, as indicated at 16, although this portion may be slightly tapered. A relatively sharp shoulder 17 is formed between the tops of the serrations and the smooth reduced portion 16.

Associated with the tubular member is a collar 18 externally threaded from end to end with threads 19. This collar has an internal smooth bore complementary to the smooth external surface 16 but has an internal flange 20 adapted to overlie the top of the tubular member. The external threads are designed to fit threads 21 that may be tapped into the enlarged top of the hole 13.

In the form illustrated in Figs. 1 and 2, the internal flange 20 is utilized as a means for tightening the collar in position and to this end it is illustrated as having a hexagonal interior configuration designed to receive an "Allen" set screw wrench. The interior of the flange may be given other non-circular shapes to accommodate other types of wrenches by which the collar can be rotated. In the construction illustrated in Fig. 3, the presence of the flange enables a screw driver kerf 22 to be formed in the top of the collar to receive a screw driver or spanner wrench by which the collar can be tightened in position, the flange providing adequate material at the top of the collar to form walls for the screw driver kerf of adequate size.

In installing the nut the hole 13 is assumed to have been drilled or cast into the article A and its enlarged upper end is assumed to have been tapped to provide the threads complementary to the threads on the collar. The tubular member is then positioned with the pilot 12 entering the hole and is forced into the hole during which the vertical serrations cut or broach their own paths into the walls of the hole. The cuttings cut by these serrations are received in the groove 14. In this manner the serrations tend to lock the body 10 against rotation within the hole. The collar is then positioned over the upper portion of the tubular member and is screwed into the upper tapped portion of the hole and tightened by applying an "Allen" wrench to the interior of the flange in the form illustrated in Figs. 1 and 2, or by applying a screw driver or spanner wrench in the form illustrated in Fig. 3. The flange 20 overlying the end of the tubular member holds the tubular member against pull-out.

When the tubular member and collar are assembled together the shoulder formed by the flange 20 preferably seats on the upper end of the body simultaneously with the seating of the collar on the shoulder 17. Such an arrangement is not essential but is highly preferred to provide adequate strength against pull-out. If desired, either shoulder engagement may take place in advance of the other.

It will be observed from the above-described construction that the tubular member may be of adequate wall thickness so that even though a bolt or stud is only partially screwed therein in the threads 11, there is no danger of parting or separation of the tubular member. The snug embrace between the interior of the collar and the upper portion of the nut also resists expansion of this portion of the nut so that the bolt or stud inserted therein will not expand the nut and thus pull out of the threads 11.

Various changes may be made in the details of construction without departing from the spirit and scope of the invention as defined by the appended claims.

I claim:

1. An insert adapted for anchorage in a body of relatively softer material having a smooth walled bore extending inwardly of the surface thereof and a screw-threaded counterbore, said insert comprising: a one-piece circular body having threads for complementary engagement with a threaded member to be secured thereto, said body being adapted to be forced axially into the bore and having a plurality of longitudinal broaching serrations on the inner end thereof adapted to broach their way into the side wall of the bore to lock said body against rotation, said body outwardly of said serrations having a portion provided with a smooth walled exterior terminating at its outer end in an outwardly-facing annular abutment surface adapted to be disposed outwardly of the bore; and an apertured locking collar having exterior threads complementary to those in the counterbore for threading engagement therewith and a smooth walled interior portion complementary to said smooth walled body portion for free axial and rotary movement thereon, the outer end of said smooth walled collar portion terminating in an inwardly-facing ledge for engagement against said outwardly-facing abutment surface on said body to lock the latter against outward movement, the minor inner radial dimension of said collar being at least as large as the major radial dimension of said body threads.

2. The structure defined in claim 1 wherein the inner periphery of the collar ledge is non-circular for engagement by a collar-rotating tool.

3. An insert adapted for anchorage in a body of relatively softer material having a smooth walled bore extending inwardly of the surface thereof and a screw-threaded counterbore, said insert comprising: a one-piece circular body having threads for complementary engagement with a threaded member to be secured thereto, said body being adapted to be forced axially into the bore and having a plurality of longitudinal broaching serrations on the inner end thereof adapted to broach their way into the side wall of the bore to lock said body against rotation, said body outwardly of said serrations having a portion provided with a smooth walled exterior terminating at its outer and inner ends in outwardly-facing annular abutment surfaces both adapted to be disposed outwardly of the bore; and an apertured locking collar having exterior threads complementary to those in the counterbore for threading engagement therewith and a smooth walled interior portion complementary to said smooth walled body portion for free axial and rotary movement thereon, said collar portion terminating at its outer and inner ends in inwardly-facing annular abutment surfaces, one of said collar abutment surfaces being adapted to engage the corresponding body abutment surface for locking said body against outward movement, the minor inner radial dimension of said collar being at least as large as the major radial dimension of said body threads.

4. An insert adapted for anchorage in a body of relatively softer material having a smooth walled bore extending inwardly of the surface thereof and a screwthreaded counterbore, said insert comprising: a one-piece circular body having threads for complementary engagement with a threaded member to be secured thereto, said body being adapted to be forced axially into the bore and having a plurality of longitudinal broaching serrations on the inner end thereof adapted to broach their way into the side wall of the bore to lock said body against rotation, said body outwardly of said serrations having a portion provided with a smooth walled exterior terminating at its inner end in an outwardly-facing shoulder adapted to be disposed outwardly of the bore and at its outer end in an outwardly-facing annular abutment surface; and an apertured locking collar having exterior threads complementary to those in the counterbore for threading engagement therewith and a smooth walled interior portion complementary to said smooth walled body portion for free axial and rotary movement thereon, said collar portion terminating at its inner end in an inwardly-facing annular abutment surface and at its outer end in an inwardly-facing ledge, the axial lengths of said body portion and said collar portion being equal, whereby said collar ledge is adapted to engage said body abutment surface and said collar abutment surface is adapted to simultaneously engage said body shoulder for locking said body against outward movement, the minor inner radial dimension of said collar being at least as large as the major radial dimension of said body threads.

5. An insert nut adapted for anchorage in a body of relatively softer material having a smooth walled bore extending inwardly of the surface thereof and a screw-threaded counterbore, said insert comprising: a one-piece circular interiorly-threaded body adapted to be forced axially into the bore and having a plurality of longitudinal broaching serrations on the inner end thereof adapted to broach their way into the side wall of the bore to lock said body against rotation, said body outwardly of said serrations having a portion provided with a smooth walled exterior; and an apertured locking collar having exterior threads complementary to those in the counterbore for threading engagement therewith and a smooth walled interior portion complementary to said smooth walled body portion for free axial and rotary movement thereon, said collar portion terminating at its outer end in an inwardly-facing ledge adapted to abut against the outer end of said circular body for locking said body against outward movement, the minor inner radial dimension of said collar being at least as large as the major radial dimension of said body threads.

6. The structure defined in claim 5 in which the smooth walled body portion terminates at its inner end in an outwardly-facing shoulder adapted to be disposed outwardly of the bore, and the locking collar terminates at its inner end in an inwardly-facing annular abutment surface adapted to seat on said body shoulder simultaneously with the abutment of the collar ledge against the outer end of said circular body for locking said body against said outward movement.

7. The structure defined in claim 5 in which the outer end of the circular body is adapted to be disposed in the counterbore and the axial length of the locking collar outwardly of the ledge thereon is substantially equal to the distance between the outer end of the circular body and the surface of the body of softer material when said circular body is installed therein, whereby said locking collar will be substantially flush with the surface of the body of material.

References Cited in the file of this patent

UNITED STATES PATENTS

| | | |
|---|---|---|
| 175,562 | Hovey | Apr. 4, 1876 |
| 269,626 | Bodel | Dec. 26, 1882 |
| 2,314,867 | Boynton | Mar. 30, 1943 |
| 2,372,485 | Griffin | Mar. 27, 1945 |
| 2,446,174 | Flynt | Aug. 3, 1948 |

FOREIGN PATENTS

| | | |
|---|---|---|
| 917,417 | France | Jan. 7, 1947 |